United States Patent [19]

Rohrer

[11] Patent Number: 4,590,606
[45] Date of Patent: May 20, 1986

[54] MULTI-FUNCTION IMAGE PROCESSING SYSTEM

[75] Inventor: Gene D. Rohrer, Concord, N.C.

[73] Assignee: International Business Machines Corporation, Armonk, N.Y.

[21] Appl. No.: 449,287

[22] Filed: Dec. 13, 1982

[51] Int. Cl.⁴ .......................... G06K 9/00; G06K 9/40
[52] U.S. Cl. ........................................ 382/7; 358/282; 382/51; 382/54; 382/56
[58] Field of Search ................... 382/54, 56, 7, 51, 46; 358/282, 284, 261

[56] References Cited

U.S. PATENT DOCUMENTS

| | | | |
|---|---|---|---|
| 3,611,267 | 10/1971 | Edling | 340/146.3 Y |
| 3,805,239 | 4/1974 | Watanabe | 382/51 |
| 3,813,485 | 5/1974 | Arps | 358/261 |
| 3,927,251 | 12/1975 | White et al. | 358/261 |
| 4,000,397 | 12/1976 | Hebert et al. | 235/61.11 E |
| 4,072,818 | 2/1978 | Coviello | 358/284 |
| 4,091,424 | 5/1978 | Widergren | 358/261 |
| 4,143,401 | 3/1979 | Coviello | 358/96 |
| 4,264,808 | 4/1981 | Owens et al. | 382/7 |
| 4,326,258 | 4/1982 | de la Guardia | 382/7 |
| 4,468,703 | 8/1984 | Fujiwara et al. | 382/51 |

OTHER PUBLICATIONS

Frei et al., "Fast Boundary Detection: a Generalization and a New Algorithm", *Digital Image Processing* (Andrews, ed.), IEEE Cat. #EHO 133-9, 1978, pp. 556-566.

D. G. Abraham, Rotating Image Data, Sep. 1978, IBM Technical Disclosure Bulletin, vol. 21, No. 4, pp. 1424-1426.

*Primary Examiner*—Leo H. Boudreau
*Assistant Examiner*—Joseph Mancuso
*Attorney, Agent, or Firm*—Bell, Seltzer, Park & Gibson

[57] ABSTRACT

A system is provided which separates line image data from a complex background by analyzing both contrast and shape characteristics of the image data. The system inherently provides image rotations and compression. Image quality monitoring is also provided.

12 Claims, 17 Drawing Figures

MULTI-FUNCTION IMAGE PROCESSING SYSTEM

FIELD OF THE INVENTION

This invention relates to the field of banking and related transactions involving documents such as checks, deposit slips, invoices, credit card receipts and the like. This invention is particularly directed at operations wherein a facsimile image of a document is electronically captured for use in processing the transaction separately from the document itself.

BACKGROUND OF THE INVENTION

It is the current practice of financial clearing houses, such as commercial banks, to issue to their customers, periodic statements summarizing transactions for the respective period, and accompanying the statement with the actual transaction documents, e.g., bank checks. This practice has been referred by some as country club billing. A modified version of this practice substitutes facsimile images of the documents for the documents themselves. These images are printed in reduced form or even in abstracted form on the statement itself, with a resultant savings of document handling by both the clearing house and the customer. To produce such a facsimile statement, it is necessary to capture an electronic image of all the checks processed and to manipulate, store and finally print the image. IBM Technical Disclosure Bulletins, Vol. 14, No. 10, March 1972, pages 2944, and Vol. 15, No. 8, January 1973, pages 2443 and 2444 address such a system.

My invention relates to the processing of facsimile image of documents, particularly of financial documents such as bank checks. Bank checks are commonly printed with scenic or patterned backgrounds for both aesthetic and security reasons. In addition, checks are handled by several people and, in the course of their useful life, may be soiled or creased in such a way as to add other non-meaningful marks or pseudo marks such as shadows. All of this background material should be eliminated from the electronic image if a clear, readable output print is to be achieved. Furthermore, any background material that is not eliminated represents useless data that occupies storage and reduces the efficiency of techniques used to compress the image for efficient storage and other computer image manipulation.

Image data is normally separated from background information by a color density threshold value that selects higher density portions as the image data. Known techniques for providing variable analog threshold levels generally represent a compromise between elimination of unwanted background and possible deletion of desired data. It is desirable for an image selection technique to be sensitive to factors other than simply local density to avoid this usual compromise election. Techniques other than simple density thresholding are known. For example, it is known to compute the first and second derivative of the image density to locate the boundaries of an image region. However, these known techniques are not part of a comprehensive system structured to provide a line image selection system capable of distinguishing desirable line images from the type of background image found on modern bank checks.

One object of my invention thus has been to provide an improved image processing system, capable of separating line text from printed background patterns as normally found on bank checks and similar documents.

Typical bank check processing machines operate at high speeds to accommodate the large number of individual documents processed daily. An image processing system, operating in conjunction with the processing of checks, must be capable of matching or exceeding the speed of the check processor; a task which is made difficult by the enormous amount of data represented by the image of even a small bank check. In addition, handling of the resultant image data must be accomplished in synchronism with the check processor and must not consume an impractical amount of computing power or memory space.

Another object of my invention has been to provide an image processor which is capable of operating at speeds compatible with the rate of document presentation normally found in high speed check processors but which requires comparatively low processing and storage capabilities, considering the amount of image data required to be processed.

Image data, as used in facsimile systems, is typically compressed by eliminating redundancy. In a bank check processing machine, it is desirable not only to compress the image data captured, but this compression should be performed as early in the sequence of events as is possible to minimize the total number of computer operations and memory cells required whenever the data is to be handled.

A still further object of my invention has been to provide an image selection process for an image processor that provides output data in a compressed format to reduce the equipment cost and processing steps required for these functions.

Bank checks and similar documents are elongated in the horizontal direction and are processed in equipment that feeds the documents along their long dimension. This arrangement makes it convenient to electronically scan the document by width-wise (vertically) extending scan lines. Printers, on the other hand, such as those that are suitable for printing an image statement, most often print on pages by a scanning print element that moves along a horizontal writing line. Image data captured in vertical scan lines form a document thus must be transformed by 90 degrees to be suitable for use in a horizontal scan printer.

Yet a further object of my invention has been to provide a bank check image processor having an output that is formatted to be readily compatible with the data stream requirements of conventional page printers.

While scanning documents with as image capturing system, it is desirable to know immediately whether the fidelity of the image is acceptable. Immediate knowledge of the image quality permits poor quality documents to be appropriately sorted for special handling while the document is readily accessible. Timely image quality information also makes it possible to halt the useless scanning of documents when the image capture system is malfunctioning.

An additional object of my invention has been to provide reliable means for electronically detecting inferior image data while scanning. The output of such detection is then used to signal the operator, sort the document to a special handling pocket, or indicate the need for maintenance action.

DISCLOSURE OF THE INVENTION

The objects of my invention are achieved by processing the image data in accordance with a pair of image data measurements that reveal areas of likely line image candidates. Decision logic circuitry acts on the measurement results to make tentative black/white decisions which are accumulated in the form of color labeled, horizontal run lengths. The tentative decisions are confirmed or refuted by testing the expanse of black regions in two dimensions. Since the information desired to be retained is virtually entirely made up of line copy, valid black line regions will tend to be bounded within predefined limits in all direction.

The two image data measurements employed in my invention are first, an edge locate measurement called DD which determine for each picture element (pel), the two-dimensional second derivative of the density with respect to distance, and second, a contrast activity measurement called TT which determines the overall contrast of pels within a localized area surrounding each pel. These measurements are computed from a 3×3 matrix of picture element density differences. A matrix this small requires a small amount of buffering to perform the logic. The data for computing both measurements originates by computing the density change across each pel in two dimensions. By so basing this computation on alternate pels, the odd-even distortion that is normally inherent in many solid state scanners due to the construction of their circuitry, is eliminated.

Although a large volume of image data is produced by a linear array, a relatively small amount of buffering and horizontal row run length counting registers are required to support all of the necessary logical operations. The run lengths generated as part of the decision process are directly usable as compressed data or can be further compressed by the use of more sophisticated techniques based on run length data. The output format of the data is rotated from its original vertical scan orientation so as to be usable as input to a horizontal line printer.

The integrity of image capture process is efficiently monitored by testing the shape of histograms of the distribution of results of the activity measurements for compliance with a predefined model.

These and other objects, features and advantages of my invention will be apparent to those skilled in the art, from the following description of a preferred illustrative embodiment wherein reference is made to the accompanying drawings, of which:

Figure 1:
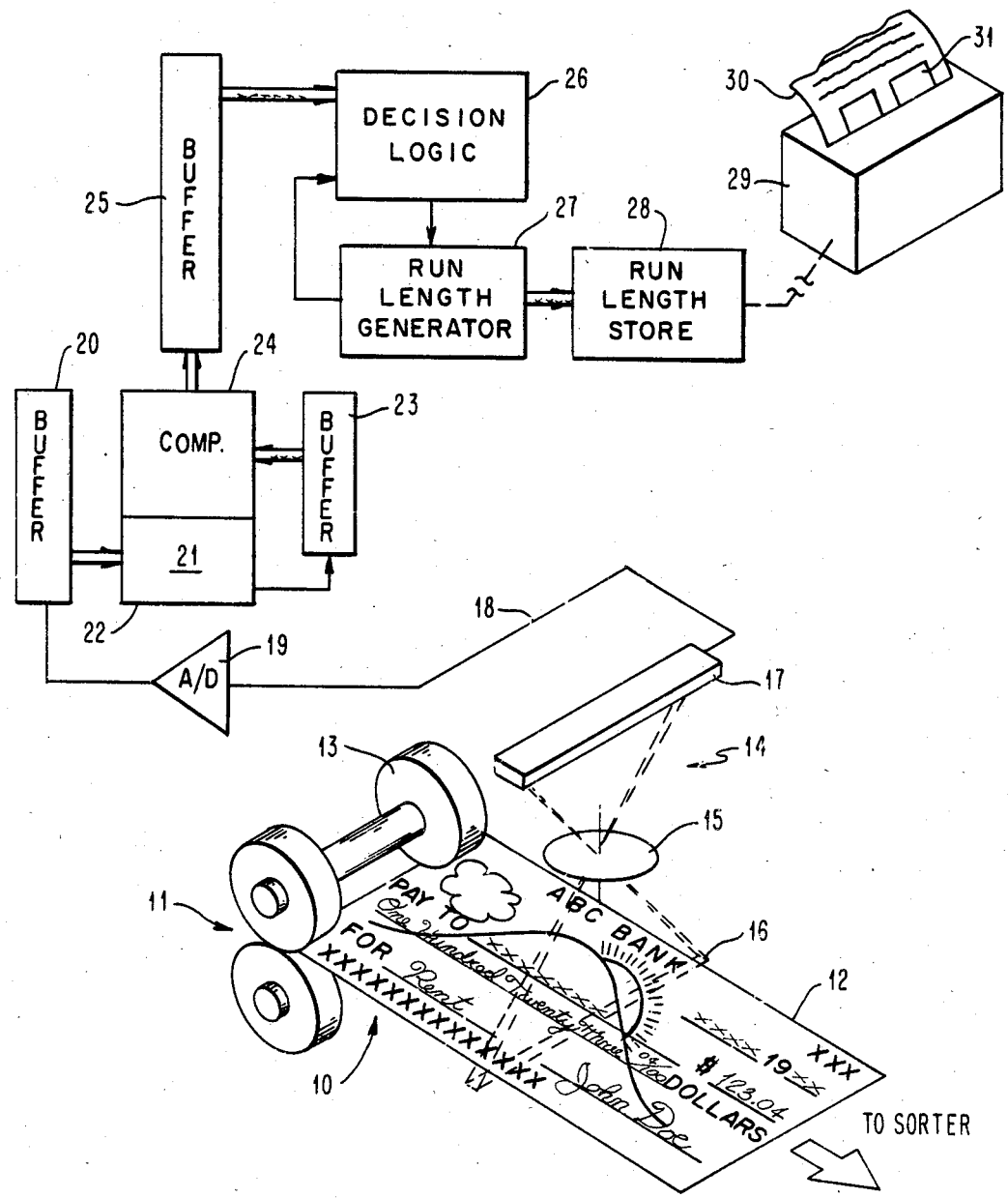
FIG. 1 shows an organizational diagram of a document image processing system employing the multifunction image data selection technique of my invention.
Figure 2:
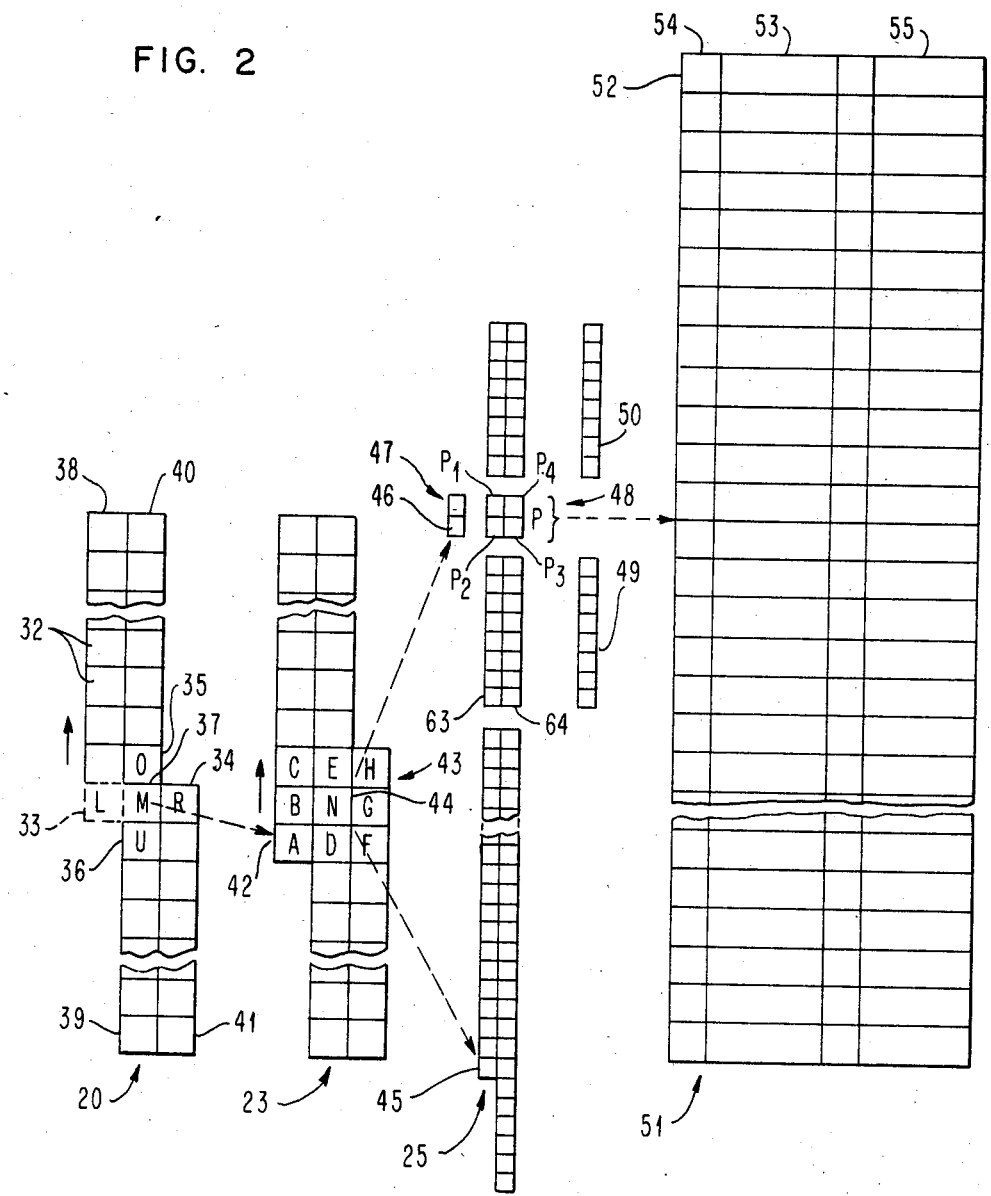
FIG. 2 is a diagrammatic view of registers and other storage laid out conceptually to illustrate the principles of the measurements and transformations employed in my invention.
Figure 3B:
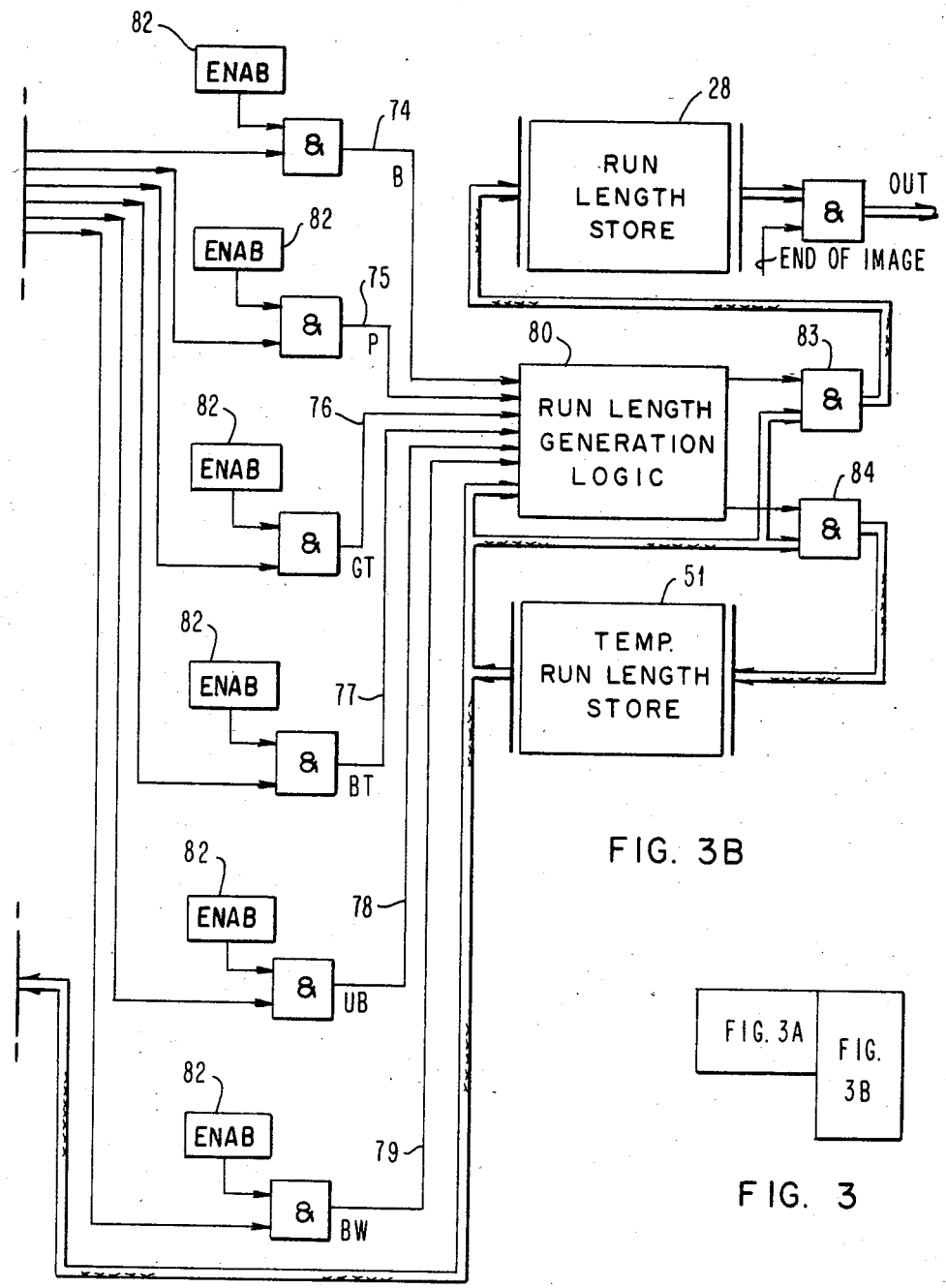
Figure 3:
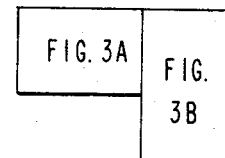
Figure 3A:
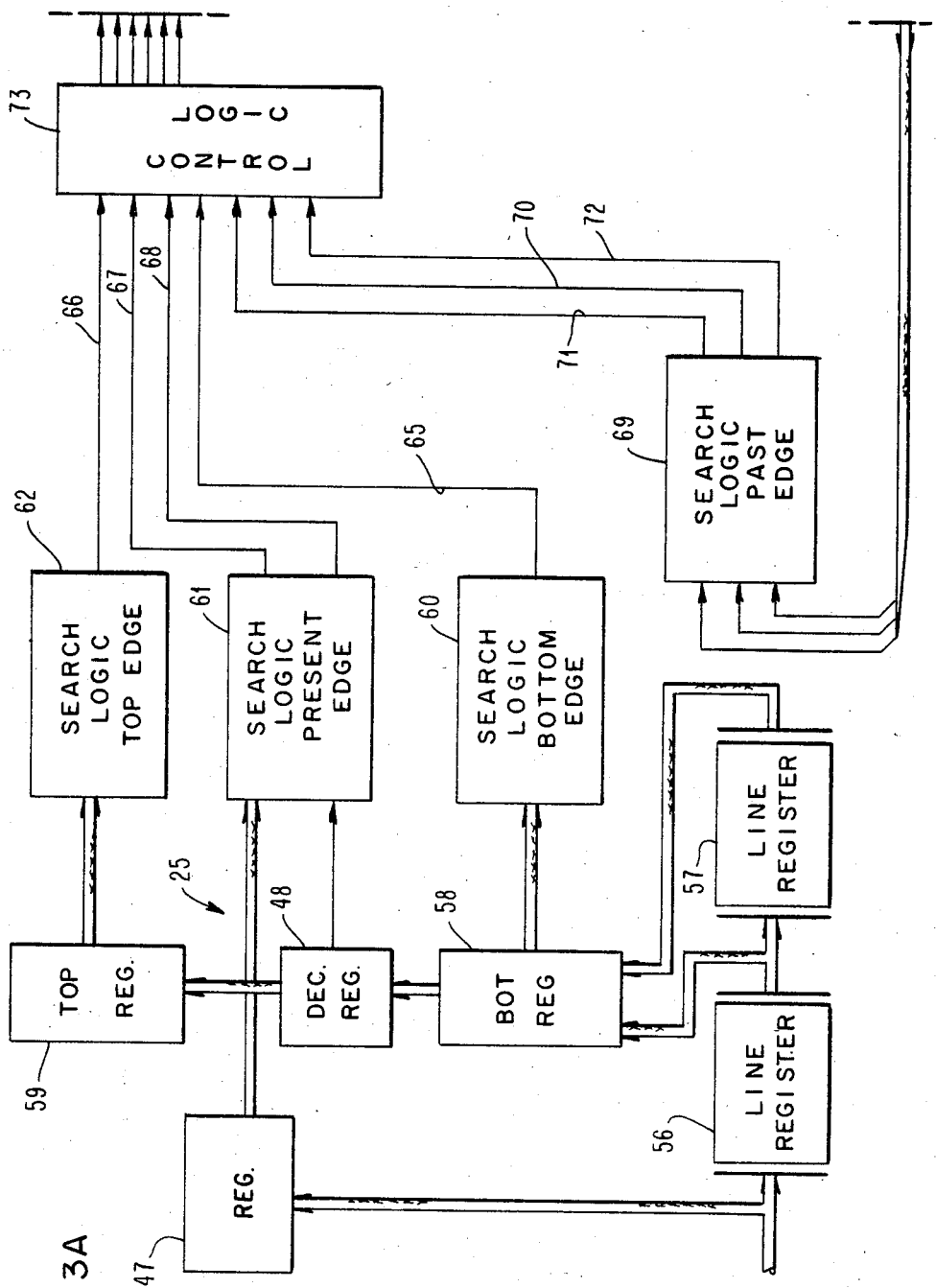
Figure 4:
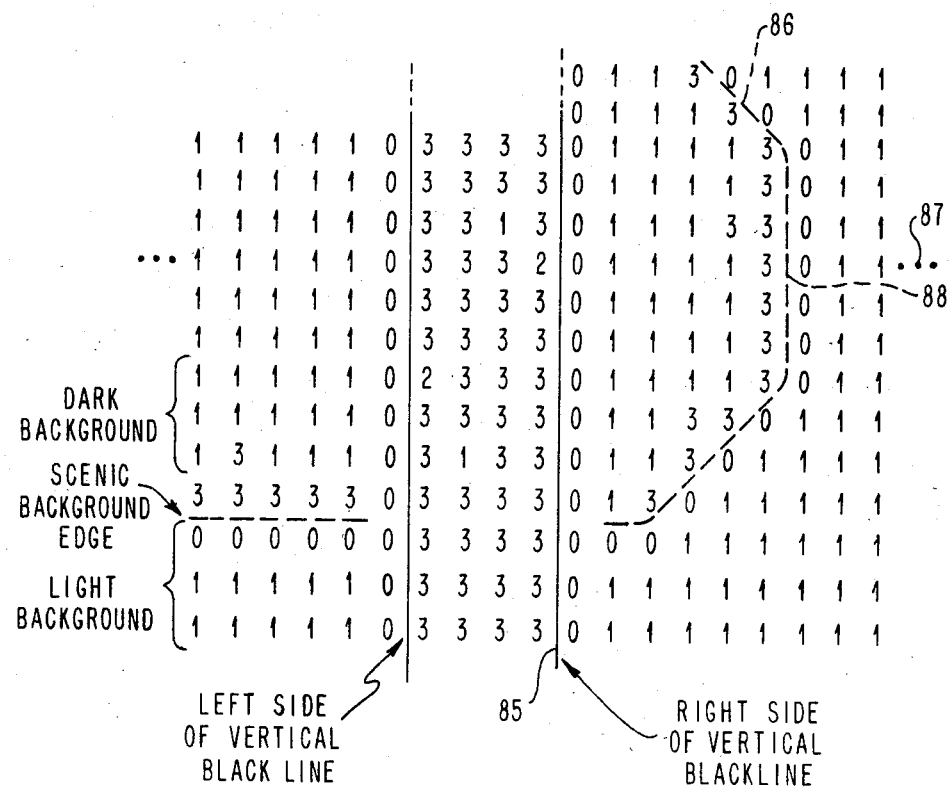
Figure 5:
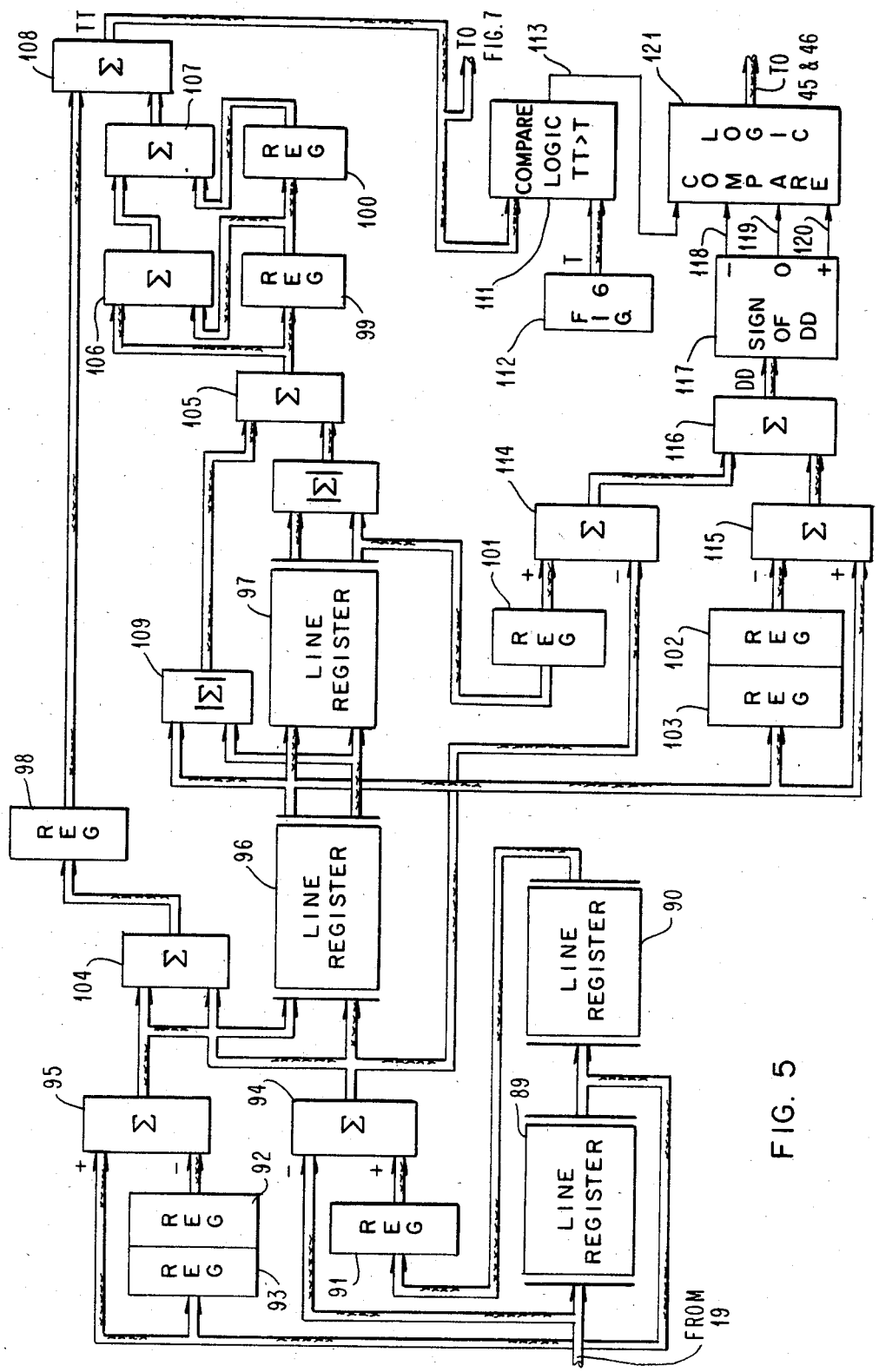
Figure 6:
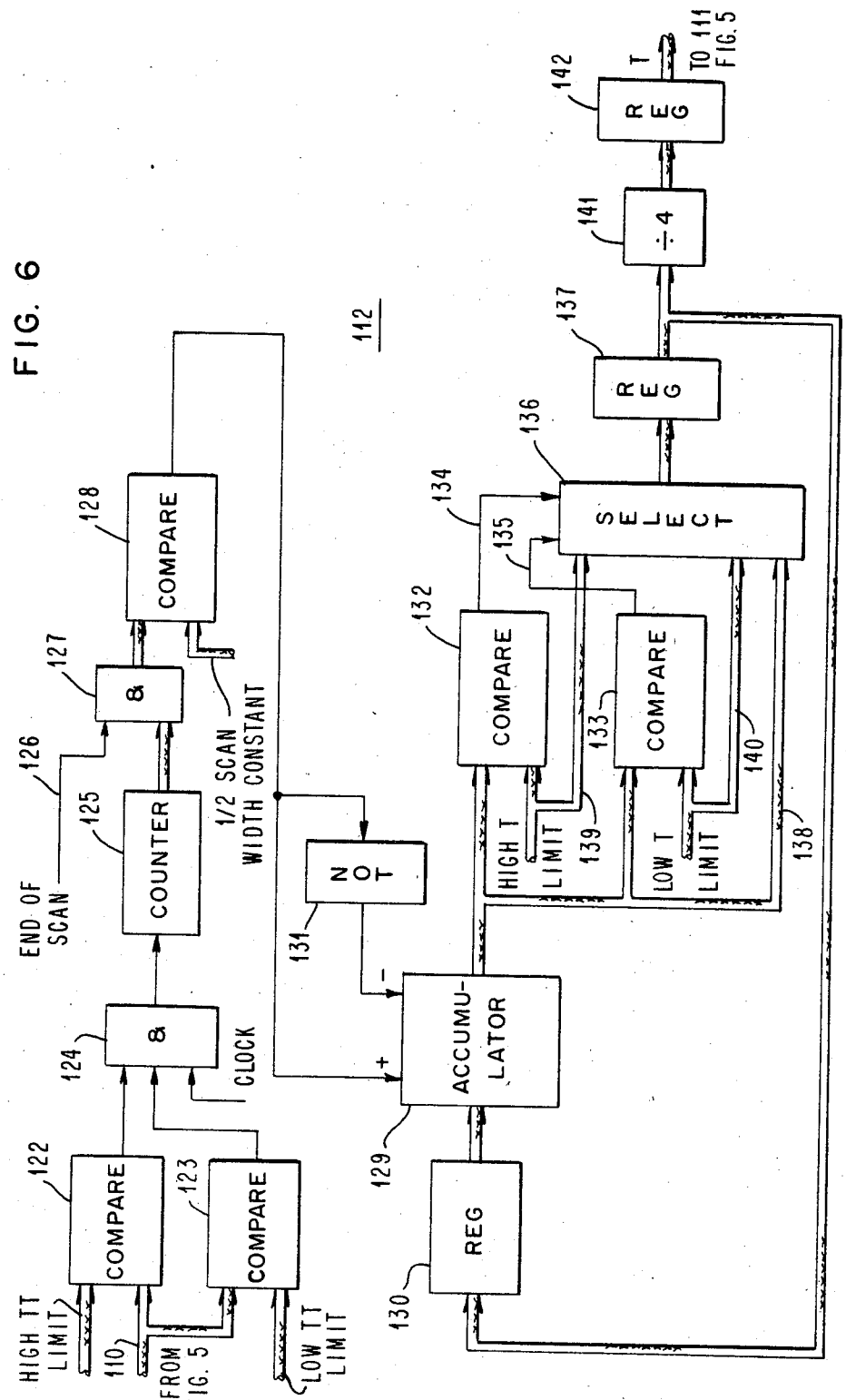
Figure 7:
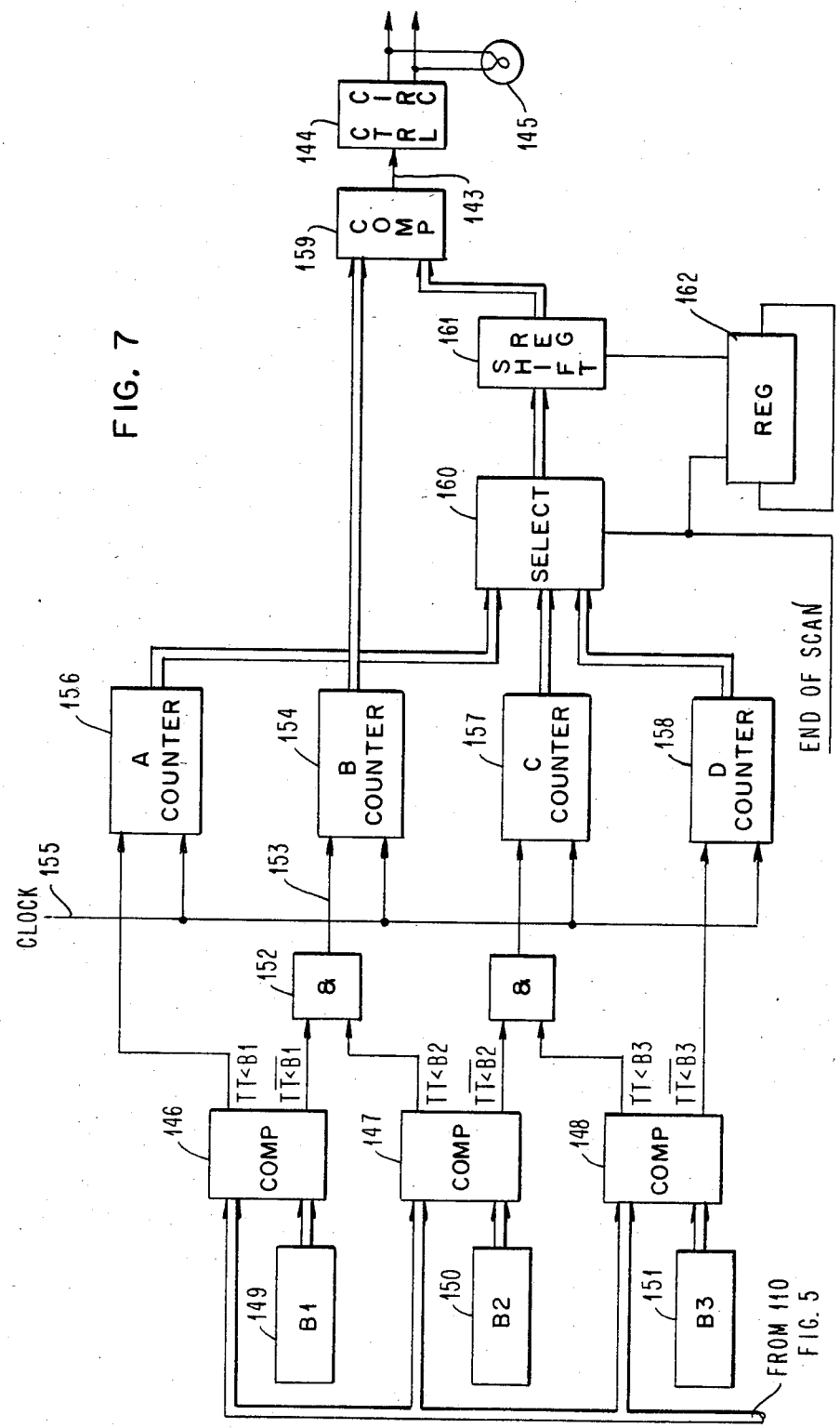

FIG. 3 which comprises FIGS. 3A and 3B, is a logic layout diagram illustrating the preferred circuitry for implementing the image selection decision in the system of FIG. 1;

FIG. 4 is a graphic explanatory view of data as it would be presented for decision in the logic circuitry of FIG. 3;

FIG. 5 is a logic layout diagram of preferred circuitry for implementing the measurements shown conceptually in connection with FIG. 2;

FIG. 6 is a logic layout diagram of noise level threshold computing logic used in conjunction with the circuitry of FIG. 5;

FIG. 7 is a logic layout diagram of the image integrity monitoring circuitry which can be employed in a preferred embodiment of my invention;

FIGS. 8a–8d are sample histograms of the results of the contrast activity measurements illustrating how the quality of the image data is revealed; and FIGS. 9a–9d are sample converted histograms showing the effective manner in which data as represented in FIGS. 8a–8d respectively is processed in the circuitry of FIG. 7.

FIG. 1 shows an image capture station 10 within a document image processing machine 11, such as a high-speed reader/sorter of a type similar to the IBM Model 3890. Such a machine typically has a plurality of processing stations at which information is taken from or added to documents moving at high speed in order to sort the documents for further transmittal and to perform accounting or recording functions of transactions represented by the documents. Although the details of the document processing machine are both well known and form no part of this invention, they are closely related to my invention, however, in that the speed of the machine's operation determines the requirements for processing document image data.

At image capture station 10, a document such as a bank check 12 is shown as it is being transported by a roller transport 13. Typically, the transport 13 operates at 350 inches per second so that the machine 11 is capable of processing 2400 documents per minute. An optical system 14 includes a lens 15 which focuses a vertical or width-wise extending elemental line 16 of the check 12 onto a linear array solid state scanner 17. Scanner 17 can employ any of several known technologies. I prefer to use a charge coupled device technology (CCD) wherein charge is accumulated to analog values in response to light reflected from picture element regions. My preferred embodiment employs a scanner 17, capable of a resolution of 240 pels per inch. Scanner 17 develops a train of analog pulses or signals representing the pels of scan line 16. The pulse train is delivered through line 18 to an analog to digital converter 19 which, for each pel, develops an optical density indicating six-bit binary number which is delivered to a grey level input store or shift register buffer 20. Gray level buffer 20 stores values between 0 and 255 for a sufficient number of pels to present a two dimensional local region of pels to the first stage 21 of image characteristics computational logic 22. Computational stage 21 transforms the image into essentially a two-dimensional first derivative which is then stored in buffer 23. A second stage of computation logic 24 computes from the data in buffer 23, a further transformation that characterizes or labels each pel on a scale of 0 to 3, based upon the activity and edge locate measurements of my invention, hereinafter fully described. This four-label image is delivered to a buffer or transition store 25 having a plurality of stages or storage locations sufficient to hold two lines of transformed image data. The transition store 25 presents the transformed image data to threshold decision logic 26 which makes tentative black/white decisions which are stored as run lengths extending horizontally or lengthwise with respect to the image of check 12. These run lengths are temporarily stored in run length generator 27 until verified that the tentative black/white decision was correct, whereupon a run length is transferred to a run length store 28. Store 28 thus contains an electronic equivalent output image having compressed binary valued picture elements which can be supplied to other equipment such as a facsimile statement printer 29. Printer 29 is normally of the "all points addressable" type that prints rows of picture elements horizontally of page or document 30 to record images 31 of bank checks for use as a bank statement.

The measurements and transformations performed by my invention can best be understood with reference to FIG. 2, wherein the various stages of transformation are conceptually illustrated. Buffer 20, as shown in FIG. 2, comprises a six-bit shift register having sufficient storage locations or stages 32 to store the digitized pels from two scan lines of output from scanner 17. An additional or entry stage 33 is shown in dotted lines since conceptually this storage forms part of the operation, although this storage can, as a practical matter, be provided by the output register of the typical analog to digital converter 19. Shift register buffer 20 comprises a single line of successive stages, although in FIG. 2 it is shown folded so as to graphically illustrate the relationship between certain stages 33, 34, 35 and 36 which will contain the picture elements which actually surround pel M being operated on in stage 37. Data entering at stage 33 shifts upwardly until reaching the uppermost stage 38, whereupon it next shifts to the lowermost stage 39 of the succeeding line, shifts upwardly through the topmost stage 40, from thence to the lowest stage 41 of the third line, and is discarded as it leaves final stage 34. The purpose of buffer 20 is to continuously present digitized pels to a measurement stage 37, whereby a first derivative of the image of pel M can be computed. The content of entry stage 33 corresponds to that pel L which is immediately to the left of pel M in the image of check 12. The final stage 34 contains that pel R which is immediately to the right of pel M. Stage 35 contains that pel O which is immediately over or above pel M. Stage 36 contains that pel U which is immediately under or below the pel M. The derivative at pel M consists simply of the vertical and horizontal differences between these adjacent pels. Thus, the contents of stage 34 are subtracted from the contents of stage 33 to form a difference L−R, and the contents of stage 36 are subtracted from the contents of stage 35 to form a difference O−U. These two differences are then transferred as two separate values to the first stage 42 of difference buffer 23.

The purpose of buffer 23 is to preseent a 9 pel matrix 43 of difference data thus computed for the group of adjacent pels surrounding a characterization stage 44 for the computation of the contrast activity and edge locate measurements of the image at pel N. Buffer 23 is similar to buffer 20 except that its stages contain the two items of information for each pel. Further, buffer 23 logically requires two more stages than buffer 20 to completely surround characterization stage 44 by a 3×3 matrix. The pels entering into the computation have been labeled A through H. From FIG. 2 it can be seen that the information necessary to compute the measurements concerning pel N is available as soon as the information has been computed from pel M of buffer 20. Buffers 20 and 23 thus store only that information necessary to enable their related computations, and that computation is made as soon as the last piece of data required becomes available.

The contrast activity measurement that is computed with respect to pel N from the data in buffer 23 consists of taking the absolute sum of the differences L−R and O−U for all nine pels, A through H and N, while disregarding sign (+ or −) of the differences. A high number, resulting from this computation, indicates a region of high contrast activity in the vicinity of pel N. High contrast activity is characteristic of regions containing desired image pels and are not characteristic of regions containing background image pels.

The edge locate function is computed in a manner similar to the first derivative computation from buffer 20, since this function essentially takes the second derivative of the image at pel N. Thus, the L−R values of pels B and G are subtracted, the O−U values of pels E and D are subtracted, and the resulting two differences are added algebraically to produce a number which may be positive or negative. The second derivative of image data has the characteristic of being positive on the dark side of a color transition and being negative just to the light side.

Thus, the contrast activity measurement serves to identify whether a pel is likely to be in the region of desired image data, and the edge locate measurement indicates exactly where an edge lies. These two measurements are combined logically to provide a further transformation of the image in terms of a four label definition or group of values, where each pel is labeled as a number 0,1,2 or 3.

The transformation is performed in accordance with the following table:

TABLE I

| Activity Operator | Edge Locate Operator | Result |
| --- | --- | --- |
| <T | +,0,− | 1 |
| ≧T | 0 | 2 |
| ≧T | + | 3 |
| ≧T | − | 0 |

The resultant labeling, 0, 1, 2 or 3 of pel N, is entered in the first stage 45 of buffer 25 and, for reasons hereinafter explained, is also entered into the first stage 46 of a two-stage shift register 47.

The purpose of buffer 25 is to present a pel P to stages defining a decision register 48 in the context of the 8 pels above and 8 pels below pel P, as well as 1 pel to the left of pel P, by which the proximity to pel P of black-to-white transitions can be detected to determine whether the pel lies within a closely bounded region, as expected of line copy, or lies within a more broadly bounded region characteristic of background image.

In the preferred embodiment of my invention, register 25 serves an additional function, namely that of resolution reduction. Scanner 17, as mentioned above, operates to produce pel data at a resolution of 240 pels per inch. This data is useful in enabling the computation of image characteristics, as described above; however, a lesser resolution is acceptable for storage of the image and for driving an output printer. Accordingly, buffer 25 presents for the determination of pel P, four 240-resolution pels, P1, P2, P3 and P4, which are logically combined as hereinafter described. Buffer 25 thus stores two scan lines of numerically labeled pels and simultaneously processes the two scan lines. Those skilled in the art will appreciate that the principles of my invention could operate in a similar manner if there were no resolution change at buffer 25, whereupon pel P would be a single stage, rather than the four stages as shown.

Associated with buffer 25 are a pair of single-bit edge tracking shift registers 49 and 50, whose function it is to note, by the storage of a one-bit, the presence of a directional color transition, indicating a vertical boundary within an 8-pel vertical proximity to the pel P.

Finally, shown in FIG. 2, is temporary run length store 51, which is part of the run length generator 27, shown in FIG. 1. Run length store 51 consists of a plurality of double data word stages 52, one for each horizontal row of the document image at 120 pel-per-inch resolution. The left portion 53 of each stage 52 stores a 21 bit binary number or count representing the length of a run of black picture elements as well as a prediction bit 54. The right portion 55 stores a 21 bit binary number representing the length of a run of white picture elements.

To summarize the operation up to this point, it may be seen that the original digitized grey scale pel values from scanner 17 and analog to digital converter 19 are first transformed out of buffer 20 and then out of buffer 23 into a four label image, wherein the labels of the pel (0, 1, 2 or 3), indicate the probability that that pel is part of line copy. This probability is tested on pel P at register 48 of buffer 25 by looking for the presence of edge transitions within a predetermined proximity of pel P, as well as by relating the expectations of pel P to the run length color currently in the line in which pel P resides. The logic circuitry for this operation is shown in FIG. 3, which reflects a preferred embodiment of my invention.

In FIG. 3, buffer 25 is shown broken into a series of component portions comprising a first line register 56, a second line register 57, an eight-stage bottom register 58, the decision register 48, and an eight stage top register 59. In parallel with the registers 58, 48, 59 are logic circuits 60, 61 and 62 which respectively test for an 8 pel proximity to a bottom edge, an immediate edge, and an 8 pel proximity to a top edge. Logic circuit 60 consists of the register 49 (FIG. 2) and other circuitry capable of detecting the entry into bottom register 58 of successive pels labeled 3 followed by 0 in either of the two entry stages 63 or 64. Upon such detection, a logical "1" is entered into the first or lowest stage of register 49. Logic circuit 60 further includes detector logic for putting an output on line 65 at any time that a "1" is present in register 49. A "1" on line 65 thus reflects the fact that starting from the decision pel P and moving downwardly, a black-to-white transition occurs within an eight-pel proximity.

Logic circuit 62 is similar to logic circuit 60 except that transitions of 0 to 3 are entered into register 50, and an output on line 66 indicates that, starting from decision pel P and moving upwardly, a black-to-white transition occurred within the eight-pel proximity. A pel P, believed to be black, thus can be confirmed as being part of a narrow horizontal line by the fact that nearby black-to-white transition exists above and below it.

Logic circuit 61 examines the contents of decision register 48, as well as register 47 for a transition 0 to 3 or 3 to 0 which would indicate the beginning or ending, respectively of a black region. An output on line 67 indicates the presence of such a 0 t 3 transition and an output on line 68 indicates the presence of a 3 to 0 transition.

In addition to logic circuits 60, 61 and 62, there is an additional circuit 69 which transmits the color state of the current horizontal run length of the line of which pel P is a part on line 70 as well as the color state of the run length immediately above and immediately below pel P, on lines 71 and 72 respectively. The outputs from logic circuits 60, 61, 62 and 69 are transmitted to control logic 73 which recognizes a group of unique states to produce one of a group of control bits B,P,GT,BT,UB,BW on lines 74, 75, 76, 77, 78 and 79, connected to control the run length generation logic 80. A set of program select gates 81 controlled by programmable enabling registers 82 permit selective inhibition of some of the control bits where found desirable.

For each pel from decision register 48, run length generator logic 80 successively operates on a corresponding temporarily stored horizontal run length retrieved from temporary run length store 51. In the absence of the control bits B,P,GT,BT,UB,BW, being activated, the white run length in portion 55 of the respective stage 52 of store 51 will be incremented by 1. Run length generator 80 is controlled by the selective activation of the control bits to (a) increment a black run length; (b) terminate a white run length and start a black run length in the left portion 53 of the respective stage 52 of store 51; (c) change a black run length to white by adding the count in the left portion 53 of a stage 52 to the count in the right portion 55 and starting a new black run length in the left portion 53; or (d) terminate a black run length, send both the black and white run lengths stored in the respective stage 52 to the output store 28 and start a new white run length in the left portion 55 of the respective stage 52. AND circuits 83 and 84 respectively control the delivery of the temporary run lengths to store 28 or to temporary store 51 as required for the above operations.

A complete description of the operation of control logic 73 and run length generator 80 is given by the following state table:

TABLE II

| 67 | 68 | 66 | 65 | 71 | 70 | 72 | Control Bits = "1" | Comments and Action of logic 73 and run length generator 80 |
|---|---|---|---|---|---|---|---|---|
| 0 | 0 | * | * | * | 0 | 0 | none | add 1 to white run length |
| 0 | 0 | * | * | 0 | 0 | * | | |
| 0 | 0 | * | 0 | * | 0 | * | | |
| 0 | 0 | 0 | * | * | 0 | * | | |
| 1 | * | * | * | * | 0 | * | BW | Leading black edge send white run length to store 28 and begin black run length |
| * | 1 | * | * | * | 1 | * | GT | Valid end to black run length, send to store 28 and begin new white run length |
| 1 | 0 | * | * | * | 1 | * | BT | Invalid end to black run length, change run length to white and start new black run length |
| 0 | 0 | 1 | 1 | * | 1 | * | B | add to black run length |
| 0 | 0 | 1 | * | * | 1 | 1 | B | |
| 0 | 0 | * | * | 1 | 1 | 1 | B | |
| 0 | 0 | * | 1 | 1 | 1 | * | B | |
| 0 | 0 | 0 | * | 0 | 1 | * | UB | no vertical boundary on black run length, change run length to white and start new black run length |
| 0 | 0 | 1 | 1 | 1 | 0 | 1 | P | predict white-black transition on next scan, add 1 to white run length and |

TABLE II-continued record a '1' in bit position 54 to force black run start next scan \* = doesn't matter From the foregoing description, it will be appreciated that my invention selects black image pels by first making a tentative determination on the basis of the probability that the pel belongs to a desired image, i.e., a line. The tentative determination is then verified by an analysis of the actual shape of the figure described by adjacent pels using a group of proximity rules. The principles of the shape analysis can be better understood by reference to FIG. 4 which shows a small section of a document having a narrow black line 85 superimposed on a background including an edge 86 of a scenic background pattern. All of the pels in the region shown have been coded in accordance with the four label (0–3) code described above. From FIG. 4, it can be seen clearly how the adjacent pels labeled 3 and 0 indicate the boundaries of potential edges. As described above, the shape analysis logic will commence a black run length when a transition 0-3 is encountered in decision register 48.

Thus, taking a horizontal line image such as line 87, and moving from right to left, it can be seen that a scenic background edge contains a 0-3 transition at 88 which represents a possibility of a white-to-black change. When that 0-3 transition is in decision register 48, the bottom edge search logic circuit 60, FIG. 3, will perceive a transition within eight pels by the 3-0 that is immediately below line 87. The upper edge logic circuit 62 would also see a 3-0 transition within eight pels, and a run length of black would be commenced. When, however, the edge of line 85 is encountered, a further 0-3 transition is perceived, indicating a white-to-black transition. Since the run length of line 87, starting at 88, was already thought to be black, one logically would expect a black-to-white transition. The presence of the white-to-black transition indicates that the previous decision was in error. The run length accumulated prior to encountering the edge of line 85 is converted to white and added to the preceding white run length. Even if line 85 were not present, the scenic edge 86 would have been converted to white, due to either of several circumstances. For example, if the run length at line 87 exceeded a threshold count of, for example, 21, a search in upper and lower edge tracking registers 49 and 50 would be again performed to determine whether the region was closely bounded by black-to-white transitions. A long black run length in the absence of closely proximate black-to-white transitions is an indication that background, rather than a line image, is being scanned.

When the processing of run lengths by generator 80 is complete, the run length store 28 will contain the image of the line copy from document 12, stored in the form of successive two-color run lengths, running the long dimension of the check. This run length format is considerably compressed and thus can be more efficiently processed or stored than the original digitized pel by pel version of the image data. The compressed data can be further compressed in accordance with a standard compression format, if desired. One particularly beneficial compression system is described in co-assigned Patent Application Ser. No. 453,021 filed Dec. 27, 1982 which performs the compression directly from the stored run lengths. The stored run length data, whether or not further compressed, has effectively been rotated from the form in which it was initially captured by scanner 17. In its rotated format, it can be conveniently delivered to a printer such as 29, wherein successive horizontal lines are printed as horizontal series of dots.

A preferred embodiment of logic circuitry for performing the measurements described in connection with FIG. 2, is shown in FIGS. 5 & 6. In FIG. 5, buffer 20 comprises shift registers 89 and 90, as well as registers 91, 92 and 93. Difference circuit 94 performs the subtraction of R from L of FIG. 2, and difference circuit 95 performs the subtraction of U from O. The resultant differences are stored in shift register 96, which comprises one part of the buffer 23, the other part being shift register 97, as well as additional registers 98, 99, 100, 101, 102 and 103. Summing circuits 104, 105, 106, 107, 108 and 109 create the contrast activity measurement variable TT at output 110 by adding together all of the difference values of the 9-pel matrix 43 of buffer 23, shown in FIG. 2. This absolute value of this summation is supplied to characterization compare logic 111 which determines its relationship to a noise threshold T, supplied from circuit 112, hereinafter described in connection with FIG. 6. The output of compare logic 111 classifies each picture element by indicating on line 113 whether the contrast activity variable TT is greater than, equal to, or less than noise threshold level T.

Summing circuits 114, 115 and 116 compute the horizontal and vertical differences, respectively, of pels B and G, and E and D of the 9-pel matrix 43 in buffer 23, FIG. 2; add the difference; and supply the result to characterizing compare logic 117, which classifies each picture element by indicating by an output on one of three lines 120, 119 or 118, respectively, whether the edge locate measurement DD is greater than, equal to, or less than 0. These lines are connected to further compare logic 121 which performs the combinational logic described above in Table I above to transform the picture elements by assigning a value 0 through 3 to a pel loaded into input stage 45 of transition buffer 25 and stage 46 of register 47, to correspond to pel N of buffer 23, FIG. 2.

FIG. 6 shows details of circuit 112 which computes noise level threshold value T to be supplied to compare logic 111 at the end of each scan line. Circuit 112 operates to determine the number of pels in a scan line having an contrast activity measurement TT between a set of predefined limits whereby an average noise level contrast activity measurement is established for a current scan line. As each TT measurement is presented on line 110, FIG. 5, its value is presented to compare circuits 122 and 123, which determine respectively, whether the value of TT is less than a maximum limit (circuit 122) or is greater than a minimum limit (circuit 123). Only when the activity measurement is between these preset limits will a logical "1" be presented by both circuits 122 and 123. In this event, AND circuit 124, when gated by its clock pulse, will pass a "1" to be accumulated by counter 125.

At the end of each vertical scan, a gate pulse on input 126 to AND circuit 127 delivers the contents of counter 125 to compare circuit 128. A fixed value representing one half of the total number of pels in a scan line is also presented to compare circuit 128. A logical "1" is emitted from compare circuit 128 if the contents of counter 125 is less than one half the number of pels in a scan line. This "1" is added in accumulator register 129 to the content of a previous value register 130 to update the history of the contrast measurement results. Conversely, a "0" from compare circuit 128 acts through invertor 131 to subtract 1 from the content of previous value register 130. Compare circuits 132 and 133 each test whether the resultant content of accumulator 129 is less than a high preset limit (circuit 132) or is greater than a low preset limit (circuit 133). The results of this comparison are delivered by lines 134 and 135 respectively to control select circuit 136 to pass one of three values to output register 137. When the content of accumulator 129 is between these limits, the value presented on lines 138 will be selected by circuit 136. Otherwise the preset limit on lines 139 or 140 which was exceeded will be selected.

The content of register 137 is divided by four in circuit 141 and the result is stored in register 142 for supply to compare logic 111, FIG. 5. The content of register 137 is also returned to previous value register 130 for use during processing subsequent scan line.

FIG. 7 shows a circuit for monitoring image quality. This circuit produces a logical "1" on output line 143 whenever inadequate document quality has been detected. This logical "1" is delivered to a control circuit 144 to operate an indicator such as lamp 145 to notify the operator that an image quality problem exists. Control circuit 144 could as well, be arranged to operate a document sorter associated with the document processing machine 11, FIG. 1, to route the document producing the inadequate quality indication to a reject pocket for special handling. The logical "1" on output line 143 could also be accumulated to maintain a statistical record of machine performance useful in maintenance and problem diagnosis.

Figure 8A:
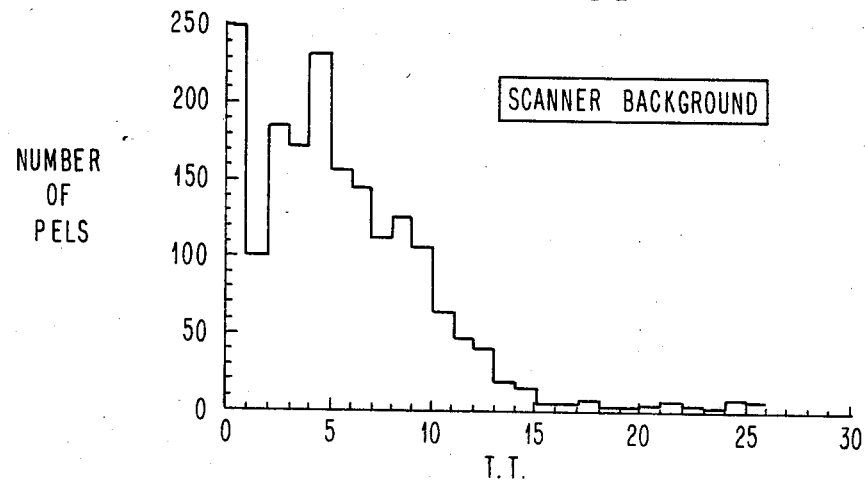
Figure 8B:
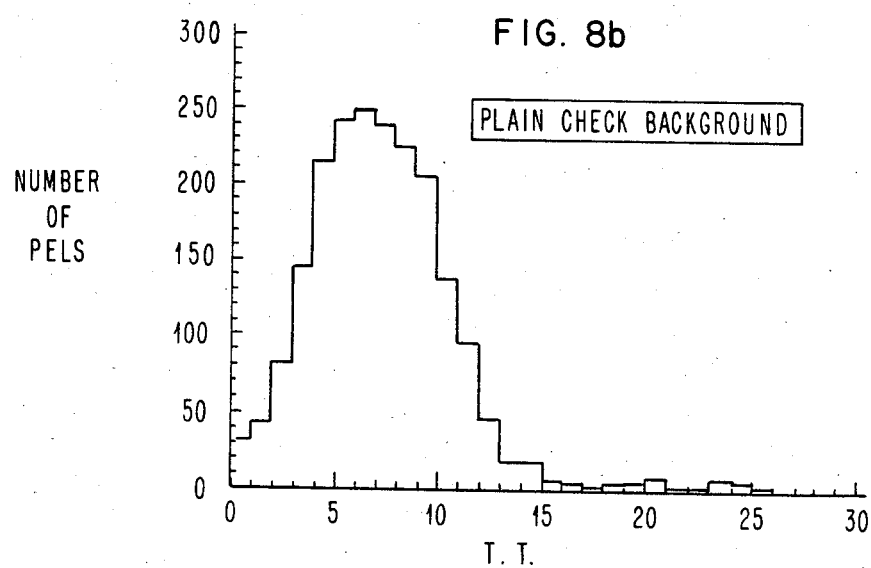
Figure 8C:
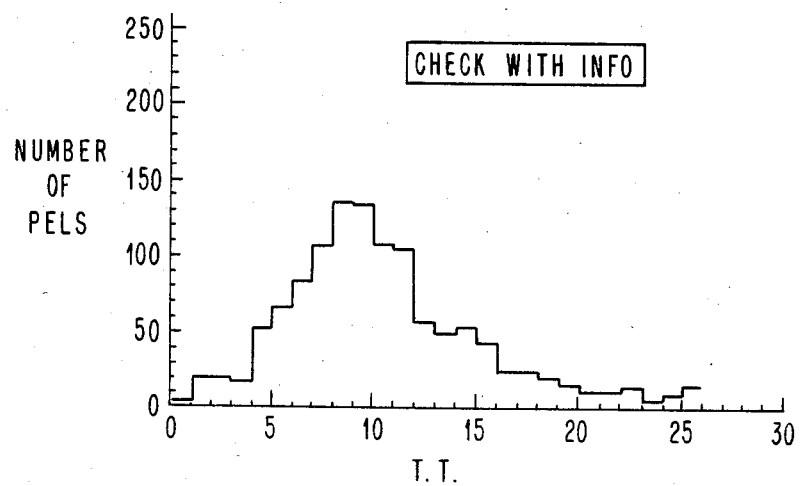
Figure 8D:
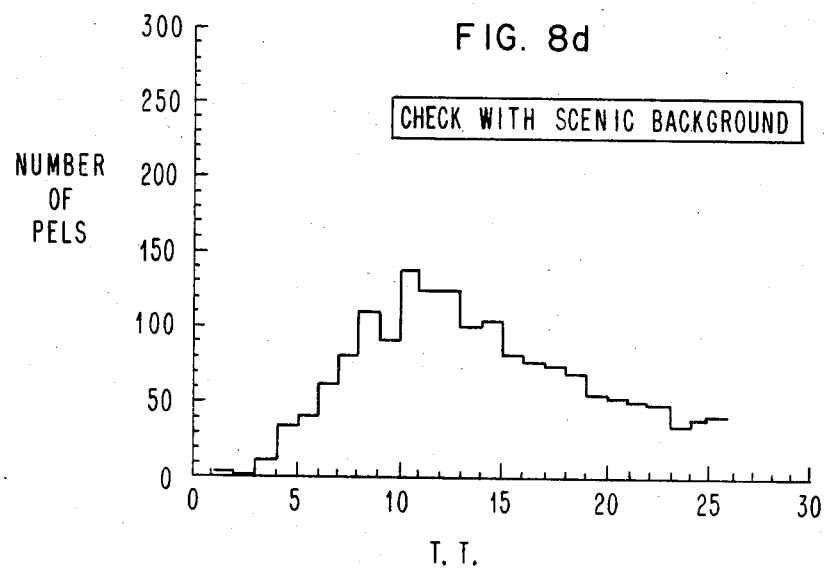
Figure 9A:
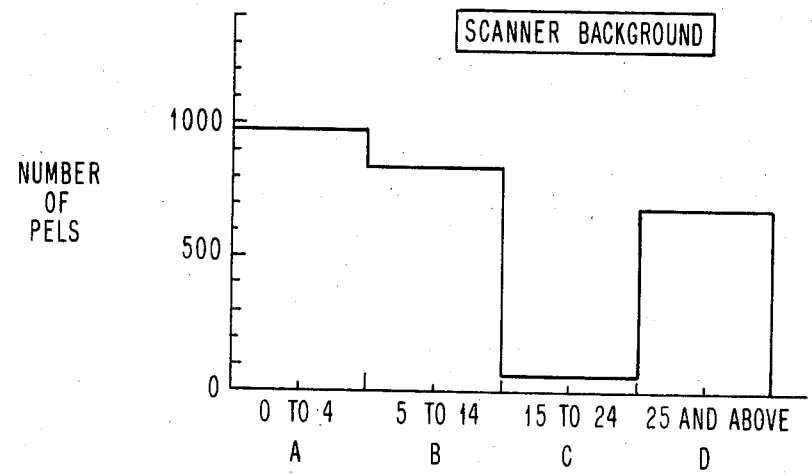
Figure 9B:
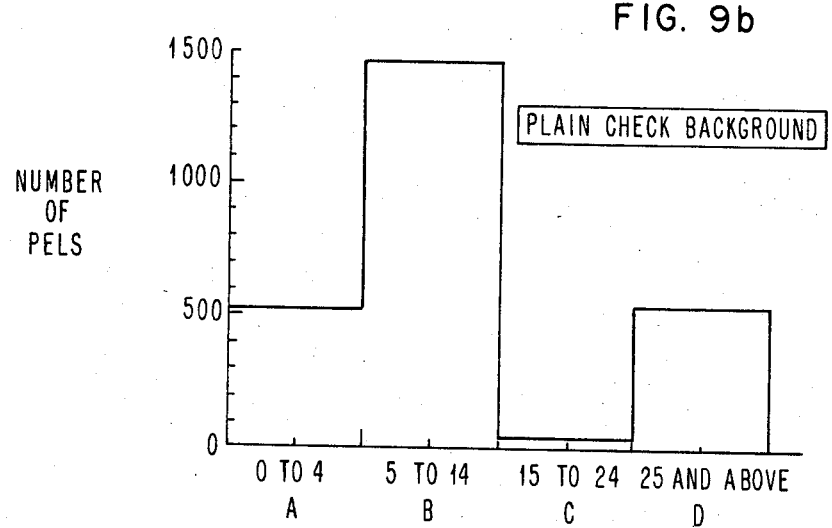
Figure 9C:
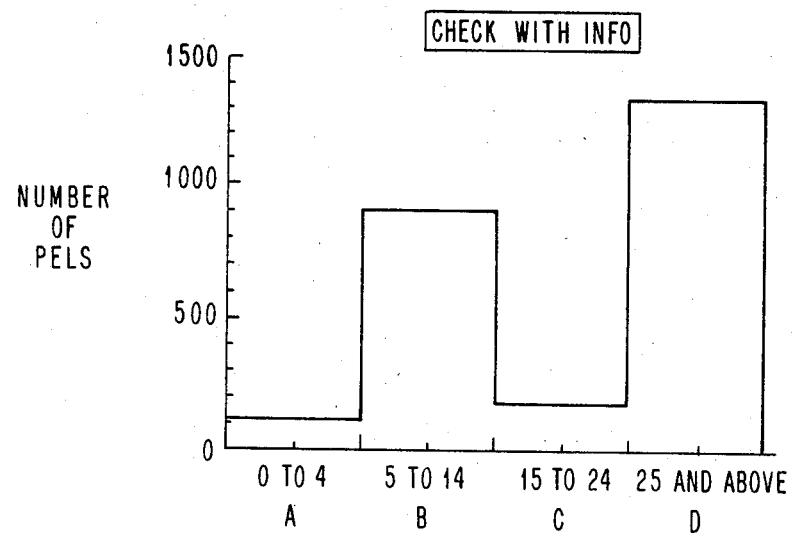
Figure 9D:
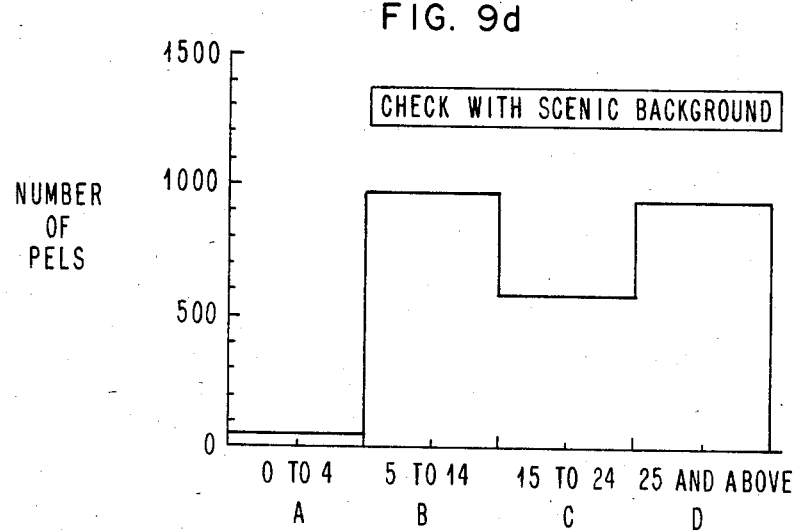

Before describing the circuitry of FIG. 7 in further detail, it is useful to understand the principles by which this circuitry operates. These principles can best be understood by reference to FIGS. 8 and 9. FIGS. 8a through 8d show histograms or graphical presentations of the results of the contrast activity measurements TT. The horizontal axis of each of the graphs represents the possible values of contrast activity measurement results. Although such results can produce values up to as high as 882, only values between 0 and 25 need be shown to illustrate the principles of my image quality monitoring system. The vertical axis of each of these graphs represents the number of picture elements (pels) which produced the particular activity measurement result. The resulting curves reveal the characteristics of the image quality, as measured by a statistical distribution of localized contrast activity. FIG. 8a shows a shape characteristic of the operation of scanner 17, FIG. 1, in the absence of a document. Such a characteristic might be produced, for example, due to an optical system failure of some type. Note that there is an abundance of very low (less than five) activity measurement values. FIG. 8b shows a shape characteristic resulting from the scanning of a plain blank check. This graph is characteristic of an acceptable image since the number of pels having an activity measurement less than five, is substantially reduced from that shown in FIG. 8a. FIG. 8c shows a characteristic curve produced from a check similar to that shown in FIG. 8b, but with information entered into the blanks of the check. Here notice a substantial increase in the number of medium valued activity measurement results (between 15 and 25) with a corresponding reduction in the number of lower valued results. FIG. 8d shows a curve characteristic of a check like that of FIG. 8c, except that it has a scenic background image, rather than a plain white image. This is an acceptable image, since there remains a significant difference between the number of moderate activity measurement results (15–25) and lower contrast activity measurement results (less than 15). Should this difference reduce too drastically, an unacceptable image would be indicated.

In order to efficiently analyze these characteristic shapes with circuitry operating contemporaneously with scanning, I prefer to abstract these shapes into classes, as defined by the following table:

TABLE III

| CLASSES | OPERATOR VALUES | DESCRIPTION |
|---|---|---|
| A | $0 < TT \leq 4$ | No Activity |
| B | $5 < TT \leq 14$ | Reference Activity |
| C | $15 < TT \leq 24$ | Background Activity |
| D | $25 < TT$ | Heavy Activity (Information) |

The graphs of FIG. 9 represent data corresponding to that shown in FIG. 8, but with the horizontal axis being divided into the four classes A, B, C and D according to Table III. The vertical axis remains as the number of pels. I have found that simple comparison operations between the relative magnitudes of the number of pels in each of these four classes will provide a measurement of image integrity that can be computed with relatively simple circuitry. Specifically, my studies have shown that three different unacceptable quality conditions can be detected if any of the relationships of the value of classes A, B, C and D, as shown in Table IV pertain.

TABLE IV

| CONDITION | |
|---|---|
| I | $2 \times A > B$ |
| II | $C > B$ |
| III | $\frac{1}{4} \times D > B$ |

The circuitry of FIG. 7 implements the computations represented by Tables III and IV. Returning to FIG. 7, there is seen a cable 110 from FIG. 5, which brings the value of the results of each activity measurement. These results are delivered to three compare circuits 146, 147 and 148. Connected respectively to these compare circuits, are reference value registers 149, 150 and 151, which contain values B1, B2, B3, respectively, that define the boundary conditions for classes A, B, C and D, Table III. With the processing of each pel by the circuitry of FIG. 5, a value presented on cable 110 will fall into ranges defined by the values of B1, B2 and B3 in registers 149 through 151. For example, if the TT value of a particular pel is 13, a logical "1" will appear on the NOT output of compare circuit 146 leading to AND circuit 152, since the value 13 is not less than the value of B1, i.e. 5. Compare circuit 147 will produce a logical "1" on its true output, also leading to AND circuit 152, since the value 13 is less than value B2, i.e. 15. Thus AND circuit 152 will produce a logical "1" on line 153 to be delivered to a counter 154.

During scanning of a document, clock pulses on line 155 advance counter 154 in the presence of the logical "1" on its input 153. Counter 154 thus accumulates a value throughout a scan that is a measure of the total number of pels falling into class B, Table III. Similarly, counters 156, 157 and 158 accumulate values representative of classes A, C and D.

As shown in Table IV above, the decision process compares various functions of the classes A, C and D to the value of class B. To implement this decision, compare circuit 159 receives the value of counter 154, at the end of a scan on one of its two inputs. A select, or switching circuit 160 operates to sequentially present the contents of counters A, C and D through multiplication shift register 161 to the other input of compare circuit 159. Circuit 159 thus is operated to sequentially perform the three comparisons needed to detect conditions I, II or III, set forth in Table IV. More specifically, the value from counter 156, when selected by circuit 160, is loaded into shift register 161 and shifted up to provide a binary multiplication by 2. This resultant value is then compared by circuit 159 to the contents of counter 154. Next, the value in counter 157 is connected by switch 160 to register 161, and is delivered to comparison circuit 159 to test for condition II. Finally, the contents of counter 158, when selected by switch 160, is delivered to shift register 161 and shifted down so as to divide the value by one-half, with the result being supplied to compare circuit 159 to test for condition III. The control of select circuit 160, and of shift register 161, is determined by a bit pattern programmed into a control register 162.

I claim:

1. An image processor for transforming an optically perceptible input image into an electronic equivalent output image having binary valued picture elements, the processor including means for developing scan lines of signals representing, as a magnitude within a multi-valued scale of magnitudes, the optical density of picture elements of the input image, wherein the improvement comprises:
   an input store comprising a plurality of first storage locations for storing representations of the magnitude signals of input image picture elements for a plurality of said scan lines;
   a transition store having a plurality of second storage locations for storing transformed representations of picture elements corresponding to input image picture elements;
   transforming means operative in response to the contents of selected storage locations of said input store for creating said transformed picture element representations in said transition store, and with the transformed picture elements being represented in said transition store by one of a group of at least two values, said transforming means comprising
   means for calculating the sum of the absolute values of the difference in magnitude signals of selected pairs of picture elements of a group bearing a predetermined adjacency relationship to picture elements being classified, and producing a calculation output,
   first characterization means for classifying picture elements of the input image in response to whether the calculation output exceeds a threshold value,
   second characterization means for classifying picture elements of the input image in accordance with the algebraic sign of the two dimensional second derivative of magnitude with respect to distance at picture elements being classified, and
   means responsive to a predetermined relationship of the classifications of picture elements by said first and second characterization means for recording selected ones of said group of values at corresponding storage locations in said transition store; and
   means for testing the proximity and relationship of adjacent differing values in said transition store and for producing the binary value electronic output image.

2. An image processor as defined in claim 1 wherein:
   said group of values which are used to represent picture elements in said transition store are determined from the threshold value obtained from said first characterization means and the algebraic sign obtained from said second characterization means in accordance with the relationships defined by the Table

TABLE I

| First Classification | Second Classification | Value [Result] |
| --- | --- | --- |
| <T | +,0,− | 1 |
| ≧T | 0 | 2 |
| ≧T | + | 3 |
| ≧T | − | 0 | wherein T is said threshold value and +,0,− are said algebraic sign.

3. An image processor as defined in claim 1 wherein said sum of the absolute values of the difference in magnitude signals of selected pairs of picture elements is computed for picture elements being classified as a contrast activity measurement variable, and wherein the improvement further comprises:
   means responsive to the history of said contrast activity measurement variable for providing said threshold value.

4. An image processor as defined in claim 3 wherein:
   said threshold providing means comprises means for periodically updating said threshold value as scan lines are processed.

5. An image processor as defined in claim 1 wherein:
   said means for producing the binary value output image includes means for changing the resolution of the image such that each picture element of said output image corresponds to a plurality of picture elements of said input image.

6. An image processor as defined in claim 1 wherein:
   said means for producing the binary value output image includes means for accumulating said output image in the form of digitally coded words defining a run length number of picture elements of one of two colors.

7. An image processor as defined in claim 1 wherein said scan lines extend along the input image in a first direction and wherein successive scan lines form a parallel line raster extending line to line in a second direction that is normal to said first direction, and wherein said means for producing the binary value output image comprises:
   means for accumulating said output image in the form of digitally coded words defining a run length number of picture elements of one of two colors, said run length extending in said second direction.

8. An image processor as defined in claim 1 wherein the storage capacity of said transition store is less than the number of picture elements comprising a document, and wherein the improvement further comprises:
   a temporary run length store;

determining means operative in respect of picture elements being processed and responsive to the proximity and relationship of other picture elements represented in said transition register for recording a run length of a tentative color in said temporary run length store by initiating or adding to run lengths accumulated therein, and for validating or changing said tentative color for a run length accumulated in said temporary run length store;

an output run length store; and means responsive to validation of a run length by said determining means for delivering the validated run length to said output run length store.

9. An image processor as defined in claim 1 wherein said sum of the absolute values of the difference in magnitude signals of selected pairs of picture elements is computed for picture elements being classified as a contrast activity measurement variable, and wherein the improvement further comprises:

means responsive to the number of picture elements of an input image having various values for the contrast activity measurement variable for producing a signal representative of image quality; and quality control operating means operative in response to said image quality signal.

10. An image processor as defined in claim 1 wherein:

said proximity and relationship responsive means comprises a pair of vertical proximity registers defining a number of picture element positions adjacent to the picture element being processed;

means responsive to vertically adjacent picture elements having selected different ones of said values for recording a change location in one of said proximity registers; and means responsive in part to the content of said proximity registers for producing said binary output image.

11. An image processor for transforming an optically perceptible input image into an electronic equivalent output image having binary valued picture elements, the processor including means for developing scan lines of signals representing, as a magnitude within a multivalued scale of magnitudes, the optical density of picture elements of the input image, wherein the improvement comprises:

means for computing in respect of each picture element, a contrast activity measurement variable by calculating the sum of the absolute values of the difference in magnitude signals of selected pairs of picture elements of a group bearing a predetermined adjacency relationship to the respective picture element;

means for determining to which of a plurality of predetermined ranges each said contrast activity measurement variable belongs;

means for accumulating the total number of picture elements of the input image having values of said contrast activity measurement variable within each said predetermined range;

means for comparing the total number of picture elements in at least one said range to preselected criteria and for producing therefrom a signal representative of image integrity; and means operative in response to said image integrity signal for monitoring image integrity.

12. A machine for processing rectangular documents, such as bank checks having desired and undesired markings thereon, comprising a document scanner for developing electronic picture element signals varying in magnitude with the optical density of an optically perceptible pattern on scanned documents, said scanner including means for scanning the documents in a predetermined scan direction extending widthwise of the rectangular documents and for producing successive scan lines of said picture element signals extending widthwise of the scanned documents, means for transforming the picture element signals of the successive widthwise scan lines into binary value output signals, means for receiving said binary output signals of the widthwise scan lines and for both compressing and rotating the signals to produce digitally coded words defining a run length number of picture elements extending lengthwise of the scanned documents, means responsive to said digitally coded words for providing printer control signals, and a printer responsive to said printer control signals for producing facsimile images of the scanned documents on an output sheet, said printer including means for printing successive lines of picture elements that extend lengthwise of the document the facsimile image of which is to be printed and transverse to the widthwise direction in which the document was originally scanned.

* * * * *